United States Patent [19]

Wright et al.

[11] 4,246,014
[45] Jan. 20, 1981

[54] BAG FILTER THIMBLE

[75] Inventors: David W. Wright, Redondo Beach; Harley G. Peterson, La Crescenta, both of Calif.

[73] Assignee: Joy Manufacturing Company, Pittsburgh, Pa.

[21] Appl. No.: 41,131

[22] Filed: May 21, 1979

[51] Int. Cl.³ .............................................. B01D 46/02
[52] U.S. Cl. .................................. 55/378; 65/341 NT
[58] Field of Search .................. 55/341 NT, 378, 381, 55/502, 374–377, 379

[56] References Cited

U.S. PATENT DOCUMENTS

| 1,821,202 | 9/1931 | Birkholz | 55/378 |
| 1,835,093 | 12/1931 | Ruemelin | 55/378 |
| 2,079,315 | 5/1937 | Dickerson | 55/381 |
| 3,401,505 | 9/1968 | Ballard | 55/341 NT |
| 4,003,727 | 1/1977 | O'Dell | 55/378 |

FOREIGN PATENT DOCUMENTS

| 345918 | 6/1920 | Fed. Rep. of Germany | 55/381 |
| 2846454 | 4/1979 | Fed. Rep. of Germany | 55/378 |
| 787871 | 9/1935 | France | 55/341 NT |

Primary Examiner—David L. Lacey
Attorney, Agent, or Firm—Thomas H. Murray

[57] ABSTRACT

A thimble construction for filter bags used in baghouses and the like which reduces the pressure drop in air approaching the thimble radially along a wall surface by causing a generally laminar flow of such air as it enters the thimble opening. The invention also contemplates a new and improved configuration in the upper portion of the thimble which provides a wedging action against the inner surface of a filter bag to promote a tighter seal and prevent gas leakage.

5 Claims, 3 Drawing Figures

BAG FILTER THIMBLE

BACKGROUND OF THE INVENTION

While not necessarily limited thereto, the present invention is particularly adapted for use in a baghouse of the type in which dust-laden air enters a lower plenum chamber and then flows upwardly through apertures in an upper wall of the plenum chamber and into a plurality of vertically-elongated tubular filter bags which separate the dust from the air as it flows through the fabric walls of the bags. The bottom of each filter bag is open and is secured to the periphery of a thimble which extends upwardly from the upper wall of the plenum chamber and surrounds an associated one of the aforesaid apertures.

In the past, thimbles of the type described above have been constructed such that a relatively sharp annular edge is presented between the upper wall of the plenum chamber and each aperture formed therein. When gas in the plenum chamber exits through an aperture of this type with a sharp edge, part of the gas will approach along the center line of the exit path through the aperture; however another part comes toward the aperture along the underside of the upper wall of the plenum from all directions. The part approaching along the underside of the upper wall has momentum toward the center of the aperture; and to turn this part of the gas around a sharp corner (i.e., through 90°) theoretically would require an infinite pressure gradient which, of course, is impossible. In actual practice, the radially-inflowing gas breaks away from the sharp corner in a turbulent flow pattern and makes a more or less gradual turn into the aperture. The result is a gas stream of smaller diameter than the aperture, a higher velocity for a given flow than would be the case if the outflow were at fullhole diameter, and a relatively high pressure drop across this point with a resultant pressure loss in the system.

SUMMARY OF THE INVENTION

In accordance with the present invention, pressure losses and turbulent airflow patterns of the type described above are materially reduced or eliminated by providing a new and improved thimble design which produces a more or less laminar flow of the radially-inflowing gas as it passes through the aperture surrounded by the thimble. This is achieved by providing a radially-extending annular flange on the bottom of the thimble which is connected to the main annular wall of the thimble through a curved portion which does not present a sharp edge to the gas flow. The annular flange is secured to the upper surface or underside of the aperture in the upper wall of the plenum chamber so that a continuous curved surface is presented to the entering airstream.

Further, in accordance with the invention, the upper periphery of the thimble is provided with a tapered step to provide, in contrast to prior art constructions, a wedging action against the inner surface of the bag's circumference to promote a tighter seal and prevent gas leakage.

The above and other objects and features of the invention will become apparent from the following detailed description taken in connection with the accompanying drawings which form a part of this specification, and in which.

Figure 1:
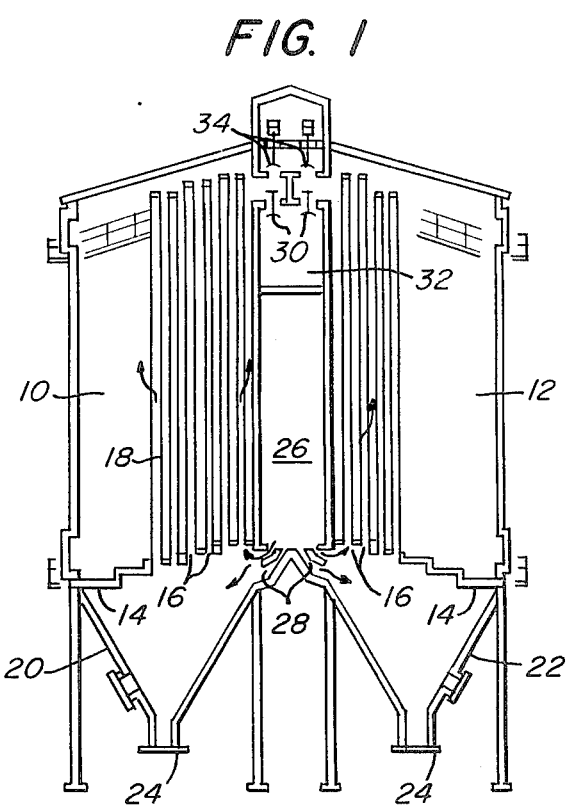
FIG. 1 is a schematic cross-sectional view of a baghouse with which the present invention may be used.

With reference now to the drawings, and particularly to FIG. 1, the baghouse shown includes a pair of gas-filtering chambers 10 and 12 each provided with a lower, stepped bottom wall 14. Formed in each bottom wall 14 is a plurality of openings or apertures 16 which are provided with a surrounding thimble, about to be described. Secured to each of the thimbles is the bottom periphery of an elongated filter bag 18 which extends throughout the entire length of an associated one of the gas-filtering chambers 10 or 12. Beneath each of the walls 14 is a hopper 20 or 22 which collects particulate material separated from an entering gas stream and is provided at its lower end with a discharge opening 24.

During a gas-filtering operation, dust-laden air enters the baghouse through a gas inlet chamber 26 and then passes through openings 28 into the respective ones of the hoppers 20 and 22. In the hopper, the gas stream reverses its direction of movement and flows upwardly into the filter bags 18. Each of the filter bags is formed from a porous fabric material which permits the gas to pass therethrough while retaining the particulate material within the interior of the filter. After passing through the bag filters, the gas then flows through valves 30 to a gas outlet chamber 32. By manipulating the valves 30, as well as the valves 34, the direction of airflow through the chambers 10 and 12 can be reversed, whereby the dust adhering to the inner periphery of each of the filter bags 18 can be blown downwardly into the hoppers 20 and 22.

Figure 2:
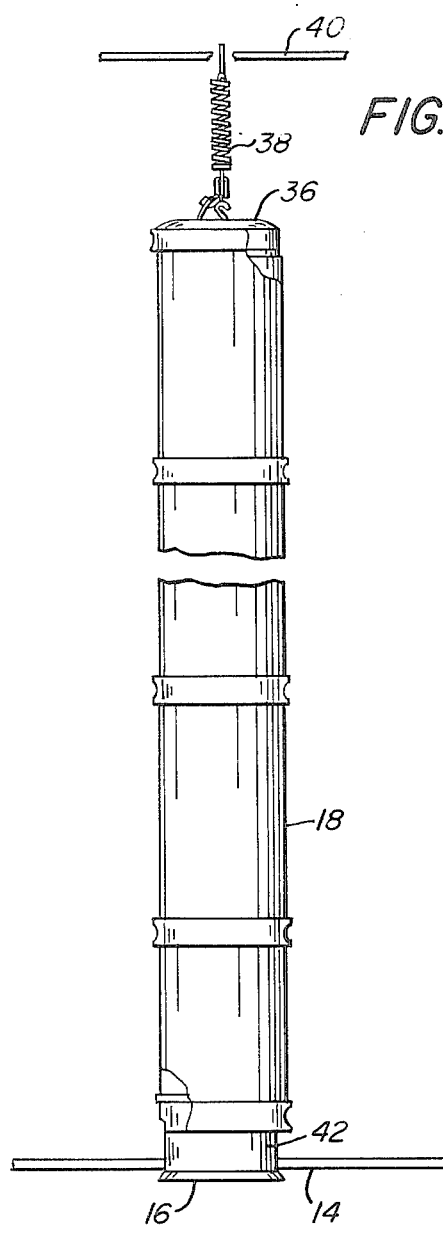
FIG. 2 is an illustration of one of the filter bags used in the baghouse of FIG. 1, showing its connection to a thimble at the bottom of the filter and to a tensioning device at the top.

The manner in which each bag 18 is suspended within an associated one of the chambers 10 or 12 is shown in FIG. 2. At the top, each bag is secured around its periphery to a cap 36 connected through a stainless or carbon steel tensioning device 38 to an upper support member 40. The bottom of the elongated filter bag 18 is secured to an annular thimble 42 which surrounds an associated opening or aperture 16 in the wall 14.

Figure 3:
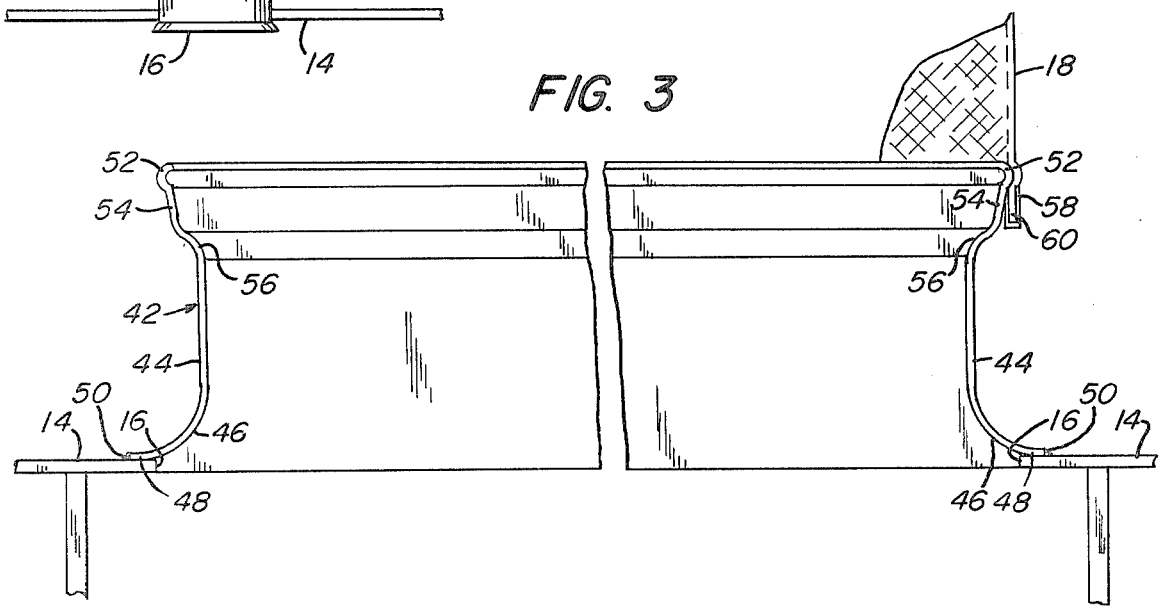
FIG. 3 is a cross-sectional view of the improved thimble of the invention.

The present invention resides in the structure of the thimble 42 which is shown in FIG. 3. It comprises a generally annular mid-section 44 connected through a lower curved portion 46 to an annular flange 48 which is secured, by means of fasteners (or welding) at 50, to the upper side or underside of the floor wall 14 around the periphery of the aperture 16.

At the top of the thimble 42 is an annular, curved portion 52 connected through tapered portions 54 and 56 to the annular wall portion 44. In the use of the thimble, the bag 18 is provided at its bottom with an annular pocket 58 containing an annular flexible metal ring device 60 which is adapted to flex and fit over portions 52 and 54 and come to rest against the tapered portion 54. By virtue of the fact that the portion 54 is tapered as shown, a wedging action against the inner surface of the bag 18 is effected to provide a tighter seal and prevent gas leakage.

As was explained above, prior art thimbles of this type are connected to the periphery of an associated opening 16 so as to provide a sharp edge between the underside of the wall 14 and the interior of the thimble. Part of the air which passes through the thimble will approach the aperture 16 along the underside of the wall 14; and this part of the gas must be turned through an angle of approximately 90° in order that it can be passed upwardly through the thimble and the filter 18. This sharp edge causes a separation of the gas stream from the periphery of the opening, assuming that it presents a sharp edge, and narrows the effective gas stream entering the thimble, thereby resulting in an excessive pressure drop.

In accordance with the present invention, however, the curved portion 46 reduces the tendency of the gas stream to separate from the thimble and produces a more or less laminar flow with a resultant decrease in the pressure drop. Preferably, the radius of the curved portion 46, which typically can be about ⅜ inch, is such as to present a cross section in which the flange 48 is at right angles to the wall portion 44, whereby the flange can be secured to the upper side or underside of the wall 14 and eliminate what would otherwise be a sharp edge at the periphery of the aperture 16. As will be understood, the aperture 16 must be larger in diameter than it otherwise would in the case where the thimble is aligned with the periphery of the aperture.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In apparatus for filtering particulate matter from a gaseous stream which includes a plenum having a wall which divides the plenum into a raw gas chamber and a clean gas chamber, a circular aperture in said wall, a thimble secured to said wall and surrounding said aperture, and a vertically-extending tubular filter bag in said clean gas chamber secured to said thimble and in flow-through communication with said raw gas chamber, the improvement in said thimble comprising an annular element having a vertically-extending annular wall of radius less than that of said circular aperture and at the bottom of said wall a radially-outwardly bent annular flange secured to the periphery of said aperture in sealing engagement therewith, and a curved portion interconnecting said annular wall and said flange, whereby gas flowing along said plenum wall will enter said aperture under essentially laminar flow conditions along said curved portion without materially separating from the wall of the thimble.

2. The apparatus of claim 1 wherein said annular flange is secured to the surface of said wall which faces said clean gas chamber.

3. The apparatus of claim 1 wherein said curved portion defines, in cross section, an arc of approximately 90°.

4. In apparatus for filtering particulate matter from a gaseous stream which includes a plenum having a wall which divides the plenum into a raw gas chamber and a clean gas chamber, a circular aperture in said wall, a thimble secured to said wall and surrounding said aperture, said thimble having a vertically-extending annular wall, and a vertically-extending tubular filter bag in said clean gas chamber secured to said thimble and in flow-through communication with said raw gas chamber, the improvement in said thimble comprising an annular outwardly-curved portion at the upper periphery of said thimble, a first inwardly-tapered portion of reduced diameter with respect to said curved portion connected to said curved portion, and an inwardly-tapered second portion interconnecting said first portion with said vertically-extending annular wall of the thimble and the lower edge of said filter bag is pressed into engagement with said first tapered portion in a wedging action against the inner surface of the bag's circumference.

5. The apparatus of claim 4 including a flexible ring for pressing the lower edge of the filter bag into engagement with said first tapered portion.

* * * * *